United States Patent [19]

Coblenz et al.

[11] 4,399,104
[45] Aug. 16, 1983

[54] DEVICE FOR THE PRODUCTION OF A REACTION MIXTURE FROM FLOWABLE FOAM-FORMING OR SOLID-FORMING COMPONENTS

[75] Inventors: Rolf Coblenz, Cologne; Klaus Schulte, Leverkusen; Wilfried Ebeling, Cologne; Dieter Evertz, Leverkusen, all of Fed. Rep. of Germany

[73] Assignee: Bayer Aktiengesellschaft, Leverkusen, Fed. Rep. of Germany

[21] Appl. No.: 183,487

[22] Filed: Sep. 2, 1980

[30] Foreign Application Priority Data

Sep. 7, 1979 [DE] Fed. Rep. of Germany ....... 2936223

[51] Int. Cl.³ .................... B01J 14/00; B01F 15/02
[52] U.S. Cl. .................... 422/111; 366/159; 366/137; 366/173; 422/112; 422/133
[58] Field of Search ........... 422/111, 112, 133, 234, 422/117; 425/4 R, 145, 146; 264/40.1, DIG. 83; 251/63, 285; 137/563, 606; 366/159, 172, 173, 182, 177, 136, 137; 239/533.1, 533.6, 533.8, 583, 584

[56] References Cited

U.S. PATENT DOCUMENTS

| | | | |
|---|---|---|---|
| 4,013,391 | 3/1977 | Boden et al. | 425/145 |
| 4,198,374 | 4/1980 | Arnaud et al. | 422/117 |
| 4,239,732 | 12/1980 | Schneider | 366/159 X |
| 4,265,858 | 5/1981 | Crum et al. | 422/133 |

Primary Examiner—Michael S. Marcus
Attorney, Agent, or Firm—Gene Harsh; Joseph C. Gil; Richard A. Elder

[57] ABSTRACT

The invention relates to a method and a device for producing a reaction mixture from flowable foam-forming or solid-forming components (preferably polyurethane forming components) which are conveyed continuously and are mixed together or are circulated. The quantity to be conveyed is preselected. The injection pressure is preselected and the circulatory pressure is measured for each component. The predetermined quantity and pressure to be conveyed as well as the measured value are preferably fed into a control computer during the circulation and the mixing process and are compared with actual values. Cavities are filled out with the reaction mixture produced and, in particular, molded articles are produced in molds.

1 Claim, 2 Drawing Figures

DEVICE FOR THE PRODUCTION OF A REACTION MIXTURE FROM FLOWABLE FOAM-FORMING OR SOLID-FORMING COMPONENTS

BACKGROUND OF THE INVENTION

In the production of molded polyurethane products from flowable reactants to obtain an end product which is free from defects, the flow rates of the components which depend on various factors such as viscosity, temperature, pressure, must be monitored continuously. As these factors are limited by variations in the structure of the components and by tolerances in the mode of operation of the mixing device, it is very difficult to keep them completely constant. It is therefore necessary to keep the flow rate constant as these factors change.

With the known devices, the metering pumps are tested by allowing the quantity conveyed per unit time to flow out at a certain pressure and then weighing it at various adjustments of the pump control path. According to the pump characteristics determined in this way (which are based on the dependence of the quantity conveyed Q as a function (f) of the control path of the pumps) the mixing device is adjusted with respect to the correct, prescribed stoichiometric ratio. This occurs before production commences. The observance of these predetermined values cannot be checked during production. An entire time-consuming and expensive test run therefore must be repeated at certain intervals to give sufficient reliability in production. This test method is also accompanied by a large unreliability factor since the weight is measured only under atmospheric pressure. If one component contains a blowing agent, the blowing agent can escape under certain circumstances due to its low boiling point.

Attempts have been made to divide at least one component stream continuously into a main stream and a subsidiary stream, the subsidiary stream being brought to the same operating pressure as the main stream just before it is introduced into the mixing zone. The volumetric rate of flow of the subsidiary stream is then measured. The quantity by volume of the subsidiary stream which has passed through during a predetermined time interval is determined by measurement. The quantity by weight which has passed through during the same predetermined time interval is determined by weighing. The density of the component is determined as a quotient of the quantity by weight and the quantity by volume. The quantitative rate of flow of the main stream of the component is determined as the product of the density of the component and the volumetric rate of flow of the main stream. This mode of operation is very complex not only with regard to monitoring but also with regard to the apparatus.

The object of the invention is to provide a method and a device for the reliable, automatic regulation and monitoring of the rates of flow during the injection and circulation at predetermined pressures.

DESCRIPTION OF THE INVENTION

Figure 1:
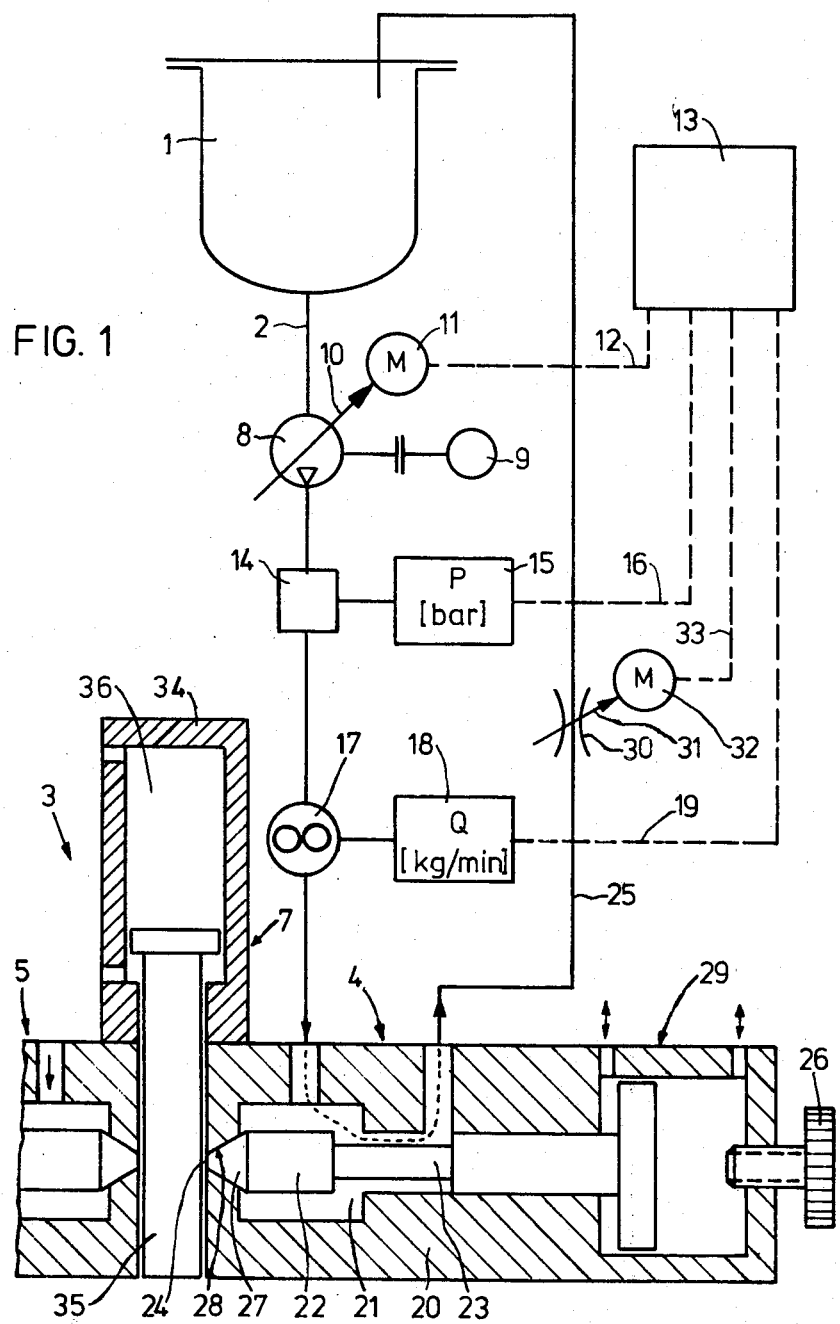
FIG. 1 shows a device according to the invention in the circulation position.

The above object is achieved by the method according to the invention in that the quantitative rate flow and the circulation pressure are controlled by adjusting the metering pump and the throttling means, the mixing process is then initiated and the injection presssure is measured and the measured value stored, the apparatus is switched back to circulation and the measured and stored value of the injection pressure acts as a new desired value for the circulation pressure, and the measuring and control process according to the previous steps is successively reintroduced.

This iterative control process allows the rate of flow to be monitored automatically. Monitoring is carried out continuously and it is not necessary to interrupt the actual course of operation.

More particularly, the invention relates to a method of producing a reaction mixture from flowable components comprising:

(A) continuously circulating said components from storage containers via feed pipes to a mix head and back to said storage containers via return pipes, said feed pipes being provided with metering pumps and said return pipes being provided with adjustable throttling means, (B) measuring the quantitative rate of flow of said components through said feed pipes and measuring the circulation pressure of the components through said return pipes, (C) adjusting the throttling means so that the circulation pressure will be ±2 bar of a predetermined circulation pressure, (D) if necessary, adjusting the metering pumps so that the quantitative rate of flow of components will be within predetermined limits of a predetermined quantitative rate of flow, (E) repeating steps (C) and (D) as often as necessary to attain both (i) a circulation pressure within ±2 bar of said predetermined circulation pressure and (ii) a quantitative rate of flow within said predetermined limits of said predetermined quantitative rate of flow, (F) once step (E) has been completed, stopping circulation step (A), and allowing said components to be mixed in said mix head, (G) measuring the pressure under which the components are mixed in said mix head, (H) repeating the process, using the measured pressure from step (G) as said predetermined circulation pressure.

The device according to the invention is based on one which, for each component, comprises:

(a) a storage container, from which
(b) a feed pipe leads to a common mix head which
(c) contains a mixing chamber into which the feed pipe opens,
(d) a metering pump located in said pipe and provided with a control device,
(e) a pressure measuring device and
(f) a quantitative rate of flow-meter being arranged in the feed pipe, and in that
(g) a needle nozzle with an associated stroke adjusting device is provided in the mix head, wherein the needle nozzle
(h) has a circulation channel, and
(ia) connects the feed pipe to a return pipe in the circulation position, (ib) connects the feed pipe to the mixing chamber in the mixing position, and wherein (j) an adjustable throttling means is provided in the return pipe.

The novelty lies in the fact that (k) the metering pump is provided with an adjusting member, (l) the throttling means is provided with an adjusting member, and (m) the adjusting members and the pressure measuring device are connected to a control computer.

The adjusting members consist of servomotors with which the metering pump control device and the throttling means adjusting device can be actuated.

The device according to the invention is illustrated purely schematically for one component in an embodiment.

The device should be enlarged in a similar manner for supplying a second or any other component.

Figure 2:
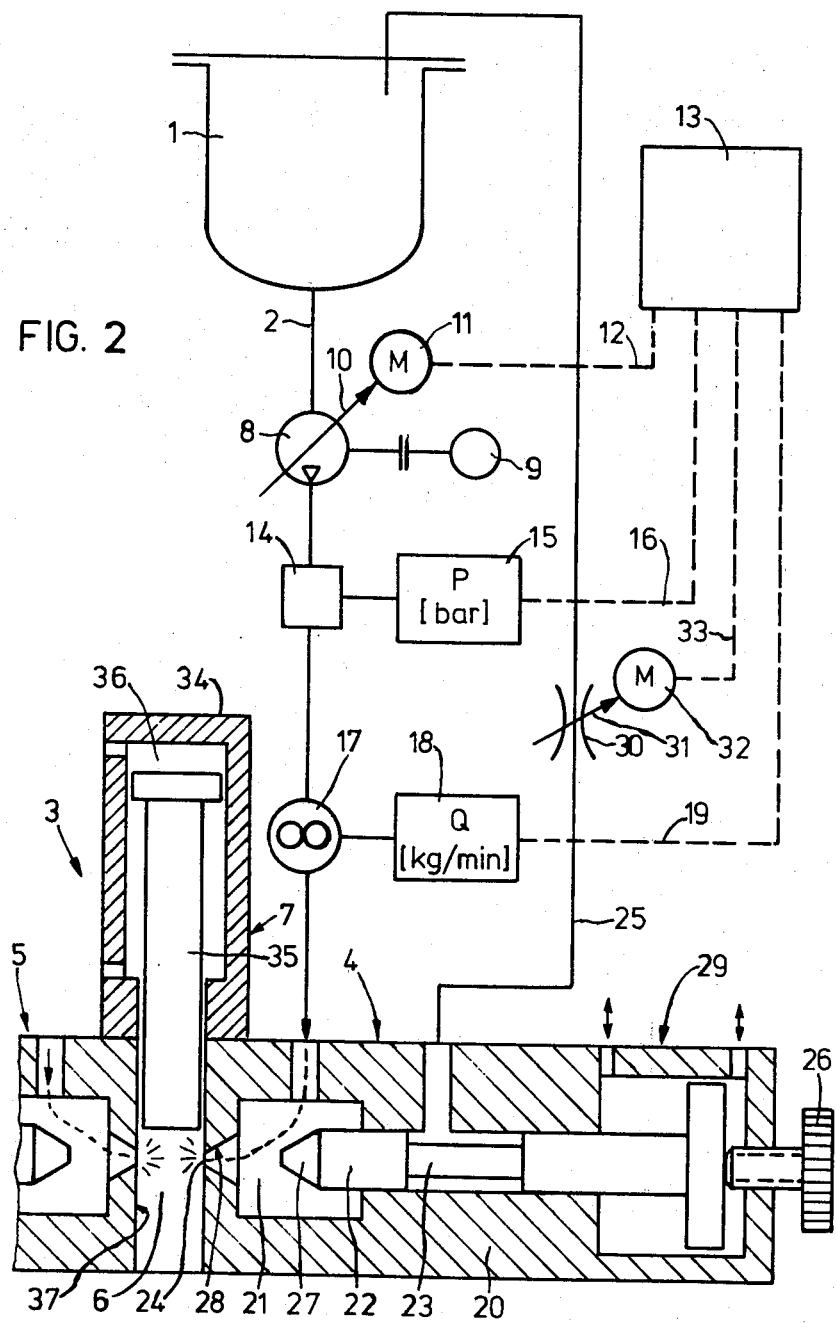
FIG. 2 shows a device according to the invention in the injection position.

A feed pipe 2 leads from a storage container 1 to a mixer head 3. The mixer head 3 consists of nozzles 4,5, a mixing chamber 6 (FIG. 2) and a cleaning device 7. A metering pump 8 is provided in the feed pipe 2 and is connected to a drive mechanism 9 operating at a constant speed. The metering pump 8 also has a control device 10 which is symbolized by an arrow and is connected to an adjusting member 11 designed as a servometer. The adjusting member 11 is connected via a pulse line 12 to a control computer 13. A pressure measuring device 14 arranged in the feed pipe 2 is coupled to a pressure displaying device 15 and connected via a pulse line 16 to the control computer 13. Finally, a quantitative flow-meter 17, which is coupled to a quantity-displaying device 18 and communicates via a pulse line 19 with the control computer 13, is also connected in the feed pipe 2. The feed pipe 2 opens into the nozzle housing 20. A nozzle needle 22 is guided in a passage 21, has a circulation channel 23 and seals the nozzle opening 24 pointing into the mixing chamber 6 in FIG. 1 but clears it in FIG. 2. A return pipe 25 branches from this housing 20 and opens into the storage container 1. In FIG. 1, the circulation channel 23 via the passage 21 represents the connection with the return pipe 25, while in FIG. 2, the nozzle needle 22 interrupts any circulation so that the component can enter the mixing chamber via the nozzle opening 24. The stroke of the nozzle needle 22 can be adjusted by means of a stroke adjusting device 26 designed as a set screw, so that the free cross-section of flow between the tip 27 of the nozzle needle 22 and the nozzle seat 28 can be adjusted. The nozzle needle 22 can be connected via a hydraulic motor 29. A throttling means 30 is arranged in the return pipe 25 and has an adjusting device 31 symbolized by an arrow. The adjusting device 31 is coupled to a servomotor acting as an adjusting member 32. The servomotor is connected via a pulse line 33 to the control computer 13. The cleaning device 7 consists of a housing 34 in which a cleaning piston 35 is guided. It is actuated by a hydraulic motor 36. In FIG. 1, the cleaning piston 35 is located in the ejection position and has displaced the mixing chamber while, in FIG. 2, it adopts the mixing position so that the mixing chamber 6 is formed in its guide passage 37.

The course of operation is illustrated below with reference to the device described above.

As already noted, the throughput capacity of the metering pump depends on the counter-pressure. The flow rate Q is given as a function of the control path Rw of the metering pump adjusting device. Moreover, the operating pressure is dependent on the adjusted path of the throttling means. These two functions $Q=f(Rw)$ and $p=f(s)$ now have to be brought into accord in terms of control. The pressure which can be read in bars on the display device 15 and the rate of flow which can be read in kg/m on the display device 18 are the control variables. The adjusting member 11 for the control path adjusting device 10 of the metering pump 8 and the adjusting member 32 for the adjusting device 31 of the throttle path of the throttling means 30 as well as the adjusting device designed as a stop screw 26 for the stroke of the injection nozzle needle 22 provide the regulating variable.

The actual control process begins as the desired values are firstly fed into the control computer 13 which processes the control and regulating variables.

The rate of flow of one component should be, for example, 10 kg/min with a maximum deviation of ±0.1 kg/min. The injection pressure should lie between 120 and 180 bar. That is, the pressure range at which the injection mixing is known to be sufficiently intensive, from experience of the mixture to be processed. The means value of the injection pressure range which is about 150 bar is advantageously selected as the predetermined pressure for the circulation. The actual pressure adjusted during control should be observed and regulated with an accuracy of 35 2 bar.

A rough preselection of the adjusting members is firstly made when the device is switched to circulation. The adjusting motor 11 for the adjusting device 10 of the metering pump 8 travels over a control path of 2.3 mmm corresponding to a throughput of 9.4 kg/min. The adjusting motor 32 for the adjusting device 31 of the throttling means 30 travels over a path of 2.07 mm. An operating pressure at the pressure display device of from 15 to 138 bar is adjusted under these conditions.

Control now begins in accordance with the following diagram:

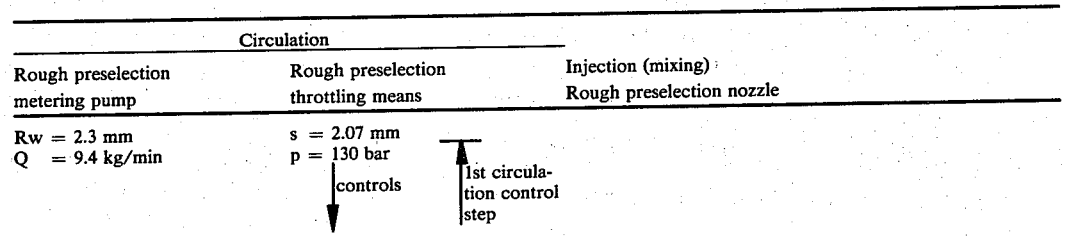

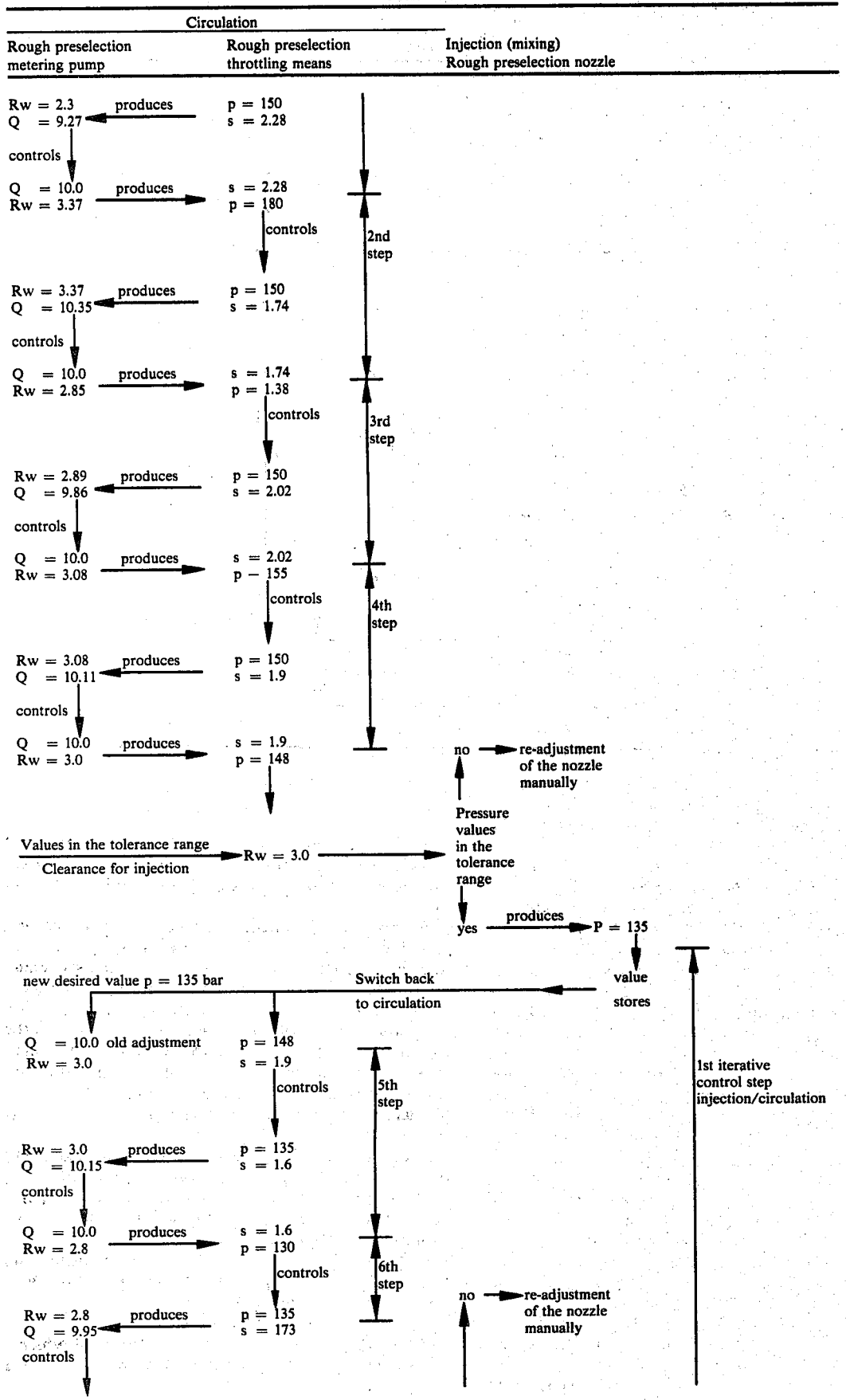

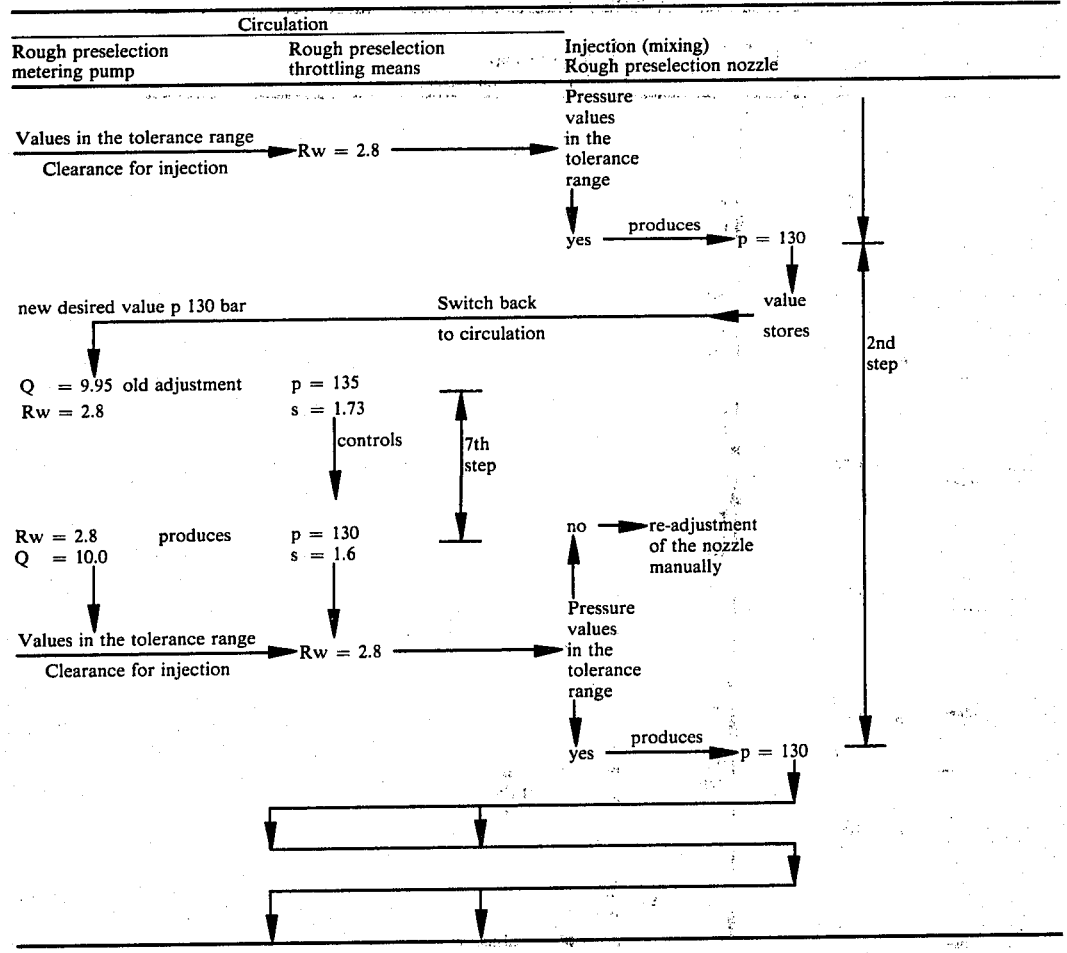

As shown by the circulation control steps, a value of Q=10.0 kg/min and p=148 bar, which lies within the permitted deviations, has been adjusted after the 4th control step.

After switching over to injection so that the mixing process is initiated, the pressure is firstly compensated. If the effective injection pressure is not within the predetermined pressure range of from 120 to 180 bar, the adjusting device 26 of the nozzle needle 22 has to be adjusted again manually. If the injection pressure is within the said pressure range, the pressure actually adjusted is recorded in the control computer 13 and, after switching back to circulation, acts as a new desired value or as a new control variable. In the above example, this value is 135 bar. The remaining circulation control steps now follow until the values lie within the new tolerance range. The device is then switched over to injection again and the injection pressure adjusted is recorded in the control computer 13. If the circulation pressure and injection pressure do not yet coincide, further regulation is made in circulation so that the last recorded value of the injection pressure acts as a new desired value for the circulation pressure. It is 130 bar in the example. The circulation pressure and injection pressure approach each other iteratively. Further equalization and control steps can be completed. In the example described above, uniformity in the pressure level is observed at the predetermined rate of flow with permitted deviations once the device has been switched to injection again. The device has thus approached the desired value iteratively after only three control and equalization processes. These values are compared, stored and adjusted in the case of each additional injection.

In this way, the injection pressure is measured and stored after equalizing the rate of flow and the pressure in circulation with the injection pressure after switching over to injection. If the injection pressure lies within the predetermined injection pressure range, the circulation is equalized again with the measured stored value of the injection pressure. If the measured value of the injection pressure lies outside the predetermined range the control has to be interrupted and the nozzle adjusted again manually. The circulation is only equalized again afterwards.

A constant check of the values is thus provided and deviations of any type, of the type which might occur, for example, due to a change in the viscosity of one component are inevitably controlled out immediately.

What is claimed is:

1. A device for producing a reaction mixture from flowable foam-forming or solid-forming components, which, for each component comprise:
   (a) a storage container, from which
   (b) a feed pipe leads to a common mix head which
   (c) contains a mixing chamber into which the feed pipe opens, (d) a metering pump with an adjustable output, a pressure measuring device and a quantitative rate of flow meter being arranged in the feed pipe, and in that
(e) a needle nozzle and an exteriorly-controlled, hydraulically-movable needle with an associated stroke adjusting device is provided in the mix head,
(f) wherein the needle nozzle,
(g) has a circulation channel, and
(ga) connects the feed pipe to a return pipe in the circulation position,
(gb) connects the feed pipe to the mixing chamber in the mixing position, and wherein
(h) an adjustable throttling means is provided in the return pipe,
characterized in that
(i) the metering pump is provided with an adjusting member,
(j) the throttling means is provided with an adjusting member, and that
(k) the adjusting members, the flow meter and the pressure measuring device are connected to a control computer.

* * * * *